United States Patent Office 2,923,503
Patented Feb. 2, 1960

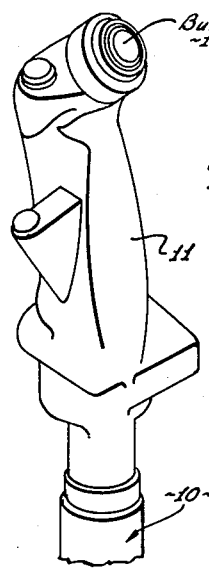
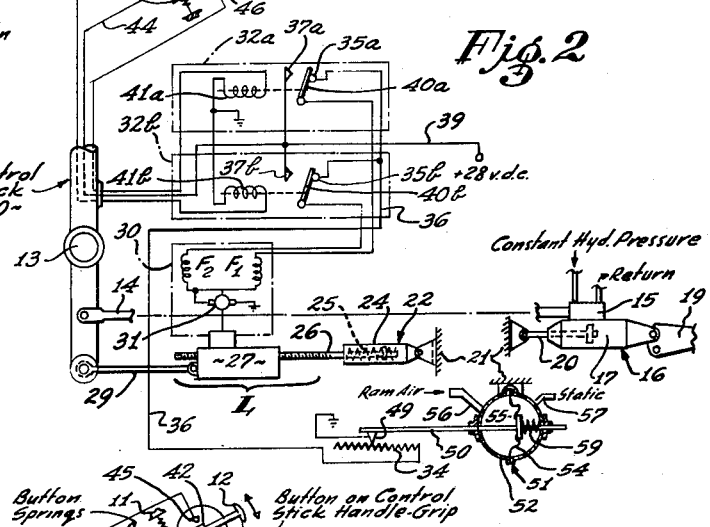

2,923,503

VARIABLE SPEED TRIM SYSTEM

Alvin R. Vogel, Los Angeles, Calif., assignor to Northrop Corporation, a corporation of California Application September 27, 1954, Serial No. 458,313

5 Claims. (Cl. 244—83)

My invention relates to airplane control surface trim systems, and more particularly to a trim system providing a variable speed trim response, suitable for use in conjunction with fully powered airplane control surfaces.

Fully powered control of airplane attitude control surfaces, such as for example by the use of the hydraulic system disclosed and claimed in the U.S. Patent to Feeney, No. 2,640,466, issued June 2, 1953, permits the pilot of the aircraft to move the attitude control surface under substantially all air loads with only the exertion of a few pounds of stick force. This feature, in modern 600 m.p.h. jet propelled airplanes, makes it possible under certain circumstances for the pilot to over-control the airplane even to the extreme extent of destruction of the craft. Various expedients have been proposed to prevent such over-control, such as the connection to the stick of artificial force producers non-linearly increasing the resistance to stick movement as airspeed increases, as disclosed and claimed for example by Ashkenas in U.S. Patent No. 2,684,215, issued July 20, 1954.

In airplanes having fully powered controls, trim is usually accomplished by changing the neutral position of the stick with relation to the neutral position of the artificial force producer acting on the stick. This can readily be accomplished by connecting the force producer with the stick through a link, the length of which is variable under the control of the pilot. Such link trimming devices are actuated by a constant speed, reversible motor in a direction under the control of the pilot, as shown and claimed by Feeney et al. in U.S. Patent No. 2,639,108, issued May 19, 1953. The present application is for an improvement over the system of this latter patent.

Just as too large and too fast movements of the control stick and controlled surface by the pilot are dangerous at high airplane speeds, so also are too large and particularly too fast trimming movements of the artificial feel mechanism. Assuming a control system wherein stick forces increase at higher airspeeds, then a trimming rate in degrees per unit of time which at low airspeed is well tolerated can be too high at high airspeeds, as the stick force would be changed at a much higher rate, too fast for accurate trimming in a condition of lower airplane stability. Accordingly it is an object of the present invention to provide, in a fully power operated attitude control system, a means for trimming the airplane by speed controlled movements of the artificial feel mechanism (force produced), so that for all conditions of flight, the trimming operations will result in the stick force variation being more nearly at a constant rate in pounds per second.

It is another object of the invention to provide an airplane trim system in which trimming speeds can be made inversely proportional to the speed of the airplane.

It is still another object of the invention to provide an airplane trim system in which trimming speeds can be made proportional to the amount of out-of-trim displacement of the artificial feel mechanism.

It is still another object of the invention to provide means for presetting the trimming speed for an airplane control system, together with means for the pilot to select trim initiation and direction at will. Other objects of the invention will be more fully understood by reference to the drawings in which:

Figure 1 is a perspective view of a pilot's control stick handle showing the location of the pilot's trim button.

Figure 2 is a schematic circuit diagram of an elevator trim system in which trimming speed is inversely in accordance with airspeed.

Figure 3 is a schematic diagram of an elevator trim system in which trimming speed is set to be in accordance with displacement of the stick away from a neutral trimmed position.

Figure 4 is a partial schematic diagram of an elevator trim system in which trimming speed is a resultant function of both airspeed and relative trim position of the control stick.

Figure 5 is a schematic diagram of an elevator trim system in which the pilot can select both speed and direction of trimming movement of the stick force producer mechanism.

Briefly, my invention comprises a variable speed motor in an airplane trim control system, and positive means for controlling the speed and direction of trim motor operation. Preferably, the speed is made to vary automatically in accordance with one or more desired factors or characteristics of airplane flight under all conditions, so that whenever a trimming operation is initiated by the pilot, the optimum speed of readjustment of control stick force toward zero will result. One arrangement for achieving the objectives of this invention includes an electric trim motor, with a variable component in a motor speed control circuit connected to be physically moved by a member whose position represents a measure of the function which it is desired to have control the trim speed.

Referring first to Figure 1 for a detailed description, a control stick 10 of an airplane is equipped with a handle 11, on which is mounted a pilot's trim control button 12. This button is movable up and down and for certain uses as will be seen later can be depressed as well.

Referring next to Figure 2 and to the control portion thereof first, the stick 10 is mounted on a pivot pin 13 for fore and aft motion and is provided below the pivot with a linkage 14 connecting the stick to the valve 15 of a hydraulic motor 16, the cylinder 17 of which is connected to an elevator control surface 19 of the airplane, with the piston rod 20 of the motor connected to the airframe 21, as shown in both the Feeney et al. patents cited above. In such a system only a small amount of force needs to be exerted by the pilot, the elevator 19 being moved entirely under the hydraulic power. Further, elevator position is at all times directly determined by stick position.

As no surface "feel" whatever is passed back to the pilot in such a system, a force producer 22 is provided such as for example a cylindrical housing 24 enclosing balanced centering force springs 25 exerting force in opposite directions on a link rod 26 entering an extension gearing box 27 which in turn is attached to stick 10 at a point below the stick's pin 13 by a bear box rod 29. Thus gear box rod 29, gear box 27 and link rod 26 form a composite extensible link L connecting the stick elastically to the airframe through the force producer 22, the neutral position of the link rod connection to the force springs 25 determining the neutral position of the stick in the absence of pilot force. As the stick position determines surface position, the length of composite link L determines the surface position in the absence of pilot force on the stick.

The force producer 22 shown herein is only representative of any type of force producer, functioning in any manner. Other force producers are commonly based on functions of airspeed, normal or vertical acceleration, or the like, and the present invention is intended to be applied to a trim system having any kind of stick force mechanisms.

A trim motor 30 is attached to gear box 27 and when actuated is connected to change the overall length of composite link L.

Under normal flying conditions, a normal stick neutral corresponds to a normal surface neutral from which the stick and surface can be operated for normal attitude control.

When a trim condition is desired, the length of the link L is changed, causing the stick by virtue of the action of force springs 25 to assume a new neutral position, thus trimming the airplane "hands off" at a different surface position.

Heretofore the change in length of a link L has been made by a constant speed motor, as for example as shown in the Feeney et al. Patent No. 2,639,108 cited above.

It has been found however, that under a number of circumstances, the trim speed should be made variable. One such circumstance is for example the desirability of slowing the action of the trim control at high aircraft speeds below that at low speeds. This can prevent over-control of trim at high speeds and can be accomplished for example by the circuit shown in Figure 2.

Here, the trim motor 30 is made reversible as for example by having the armature 31 under control of two fields $F_1$ and $F_2$, these two fields being alternatively connectable to a power source, usually 28 volts in airplanes, by the use of relays 32a and 32b respectively, the unused field being grounded through a variable resistance, in this case a potentiometer resistance 34. This is accomplished by connecting first stationary relay contacts 35a and 35b together and to one end of potentiometer resistance 34 by wire 36 and by connecting the second set of relay contacts 37a and 37b together and to the 28 v. source line 39. Relay arms 40a and 40b, respectively connected to fields $F_1$ and $F_2$, are each spring biased to both normally contact the first set of contacts 35a and 35b, shorting the fields $F_1$ and $F_2$ through each other.

Relay arms 40a and 40b are respectively actuated by relay coils 41a and 41b alternatively connectable to the positive 28 v. source 39 by the use of pilot's button 12 when moved up or down from a neutral spring biased position.

Pilot's button 12 moves a central contact 42 connected through line 44 to the 28 volt source line 39. Upward and downward movement of the central contact 42 causes electrical connection through respective top and bottom button contacts 45 and 46. Button 12 is normally centralized by button springs 47.

Movable arm 49 of potentiometer resistance 34 is grounded electrically, and is moved by a rod 50 moved by an airspeed responsive device 51. This device comprises, for example, a casing 52 through which rod 50 extends, the casing 52 being divided into two compartments by a diaphragm 54 fixed to rod 50. One compartment 55 is connected to a source of ram air by ram air pipe 56, the other compartment being connected by static pipe 57 to static or negative pressure. Diaphragm 54 is biased toward the ram air compartment 55 by a light compression spring 59, so that at zero airspeed the rod 50 places movable arm 49 of potentiometer resistance 34 at the opposite end from which wire 36 is connected, to include maximum resistance. At higher airspeeds, less resistance is included between movable arm 49 and wire 36.

Other forms of airspeed responsive device 51, or Machmeters, may be used in place of the particular airspeed bellows shown herein.

When trim motor 30 is actuated in either direction, by action of the pilot's trim button 12 energizing one of the two fields $F_1$ or $F_2$, the other field lead remains connected through the variable potentiometer resistance 34 to ground. By an electrical action commonly known, the speed of the trim motor 30 becomes faster, for example, when the amount of resistance between that other field and ground is increased. As shown, the speed of the trim motor 30 and hence the rate of change in length of composite link L will be higher at low airspeeds than at high airspeeds, thus providing the desired variable speed of the trimming function automatically in accordance with airspeed of the aircraft. Of course, trimming is not initiated at all, until the pilot's button 12 is moved to either operating position.

Another desirable action of the variable speed trim system is to increase the trimming speed at control stick positions relatively far from the trimmed position and to decrease the trimming speed when the control stick 10 is relatively near the new trimmed position. The term "trimmed position" means, of course, the stick-free equilibrium position, or "hands off" position where it remains without any pilot-applied or other external force. Figure 3 shows a circuit for this purpose.

In Figure 3, the first set of relay contacts 35a and 35b are connected together and to the tap 60 of a center-tapped potentiometer 61 by wire 36a. Operating arm 62 of center-tapped potentiometer 61 is attached to and movable in accordance with the link rod 26a of the centering force producer 22, and is electrically grounded. Tap 60 is permanently fixed, with respect to the airplane, to be directly opposite to operating arm 62 when centering force springs 25 are exactly balanced at the neutral position of the force producer, so that movement of link rod 26a, by the stick 10, will introduce more and more resistance in this circuit as the centering force springs 25 are moved in either direction and are forced farther from neutral.

Thus it is seen that with the embodiment of Figure 3, for small out-of-trim conditions, the trimming rate is automatically relatively slow and precise. When the pilot retrims from large out-of-trim conditions, however, the trimming rate is relatively faster to start with, returning toward trim more slowly as the new trimmed position is reached. The pilot is thus able to accurately judge the correct position at which to stop the trim motor 30, while not consuming excessive time in making large trim corrections.

It will be remembered that with a full powered surface control system as stated, there are no loads fed back to the control stick 10 from the surface actuator, which is hydraulic motor 16, other than small unavoidable friction loads. Therefore, the trimmed position of the stick is always determined by the force producer 22 alone, and this trimmed position is accurately represented by the position of operating arm 62 on link rod 26a opposite the center tap 60 as described with reference to Figure 3. To offset frictional loads mentioned above, the centering force springs 25 can be preloaded at the balanced centered position thereof, the preload amounting to a predetermined force just equal to or slightly greater than the total control circuit friction.

It has also been found that the allowable trimming speed can be made the resultant of the two control factors of airspeed and relative out-of-trim stick position, by returning the upper end of the unused motor field coil to ground through a combination circuit containing two variable resistances, respectively controlled by airspeed and force producer position. A circuit of this type is shown in Figure 4, where first relay contact wire 36b is connected to the "high airspeed" end of potentiometer resistance 34. Insulation means 64 is provided to electrically isolate airspeed rod 50a from the airframe 21.

Movable arm 49 of the potentiometer resistance 34, carried by rod 50a, is electrically connected to the tap 60 of center-tapped potentiometer 61. Operating arm 62, which is moved along center-tapped potentiometer 61 by force producer link rod 26a, is grounded. This series connection is an example, only of several ways of interconnecting the two variable resistances, since modifications of both series and parallel connections can be used, as desired. By designing the resistance values in accordance with particular airplane characteristics, optimum trimming speed variation will be attained for all flight conditions, from take-off and landing speed to maximum speed.

In Figure 5 is diagrammatically shown a trim system wherein trimming speed is totally under control of the airplane pilot. The pilot's trim control button 12a is slidably mounted in a bracket 65 pivotally mounted at 66 on the control stick handle 11. Bracket 65 contains a coil spring 67 acting to press outwardly on button 12a. A variable resistance 69 fixed in the bracket 65 is varied in value by means of a movable contact 70 carried by button stem 71.

Movable contact 70 is electrically grounded, and one end of variable resistance 69 is connected by an additional stick lead 72 to the first set of relay contacts 35a and 35b, the same point to which the corresponding resistance-connected wire was connected in Figures 2 and 3.

Central contact 42a on bracket 65 functions as in the previously described embodiments to select the direction of trim motor energization when button 12a is moved up or down around the bracket pivot 66. Thus, when the pilot merely rotates button 12a around the bracket pivot 66 to select the direction of trim operation, a slow speed reaction will result. If, at the same time, he pushes inwardly on button 12a, to displace coil spring 67, the trimming speed will be increased in proportion. In this form of the present invention, the pilot controls or sets the trimming speed at all times as he desires, and the manually operated means of Figure 5 is representative of all functions of speed control in a variable speed trimming system. The relays 32a and 32b naturally have the same effect on trim motor speed in either direction, assuming similar fields $F_1$ and $F_2$.

Trim button 12a can obviously be mounted in a variety of other ways suitable for utilizing two distinct motions separately or simultaneously. For thumb operation, however, the herein disclosed type of button mounting may be preferred.

If desired, a solenoid-operated motor brake may be incorporated in the trim motor power circuit. Such brakes are well known, and would be electrically disengaged whenever the motor is energized and automatically engaged when the motor is de-energized, to provide quick stopping for accurate positioning.

It is thus seen that the present invention provides a variable speed trimming system which prevents dangerous over-control of the airplane at high speeds and permits rapid retrimming from large out-of-trim displacements and at the low airspeeds during critical landing and take-off procedures. Of course, the same principles and general means shown in this application can also be used in rudder or aileron trim systems as well as in the elevator system, besides further uses with combination control surfaces and other control systems.

While the term "pilot" has been used herein as indicating a human being, it will be obvious to those skilled in the art that automatic piloting devices can be used in the operation of the airplane controls, without changing the operation of the invention described and claimed herein. The term "pilot," therefore, is used herein and in the appended claims as including both human and automatic mechanical or electronic pilot flight controls.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

What is claimed is:

1. In an airplane control system having a completely power operated attitude control surface connected to be controlled by piloting movements of a control stick, in combination, a force producer, a variable length link connecting said force producer and said stick, a reversible variable speed motor connected to said link to vary the length of said link, said motor having variable-setting speed control means, means connected to said speed control means for changing the setting of said motor speed control means in proportion to deflection of said force producer from its zero-force trim position, and said motor having directional on-off control means operable by the pilot of the airplane for energizing said motor in a desired direction, to provide a trim speed directly proportional to the amount of out-of-trim condition.

2. In an airplane having a pilot operated control connected to move an airplane control surface, a composite link connecting said pilot operated control to the frame of said airplane, said composite link including an extensible element and elastic force producing means for applying centering forces to said pilot operated control in series with said extensible element to maintain said pilot operated control in a desired first neutral position in the absence of pilot applied force, reversible power operated means including a power circuit connected to said extensible element to change the length thereof, variable speed control means in said power circuit for determining the speed at which said power operated means will operate, means for setting said speed control means in continuous accordance with the distance said pilot operated control is moved away from said first neutral position in either direction, and independently operable means in said power circuit for energizing said power operated means in a desired direction at the set speed whereby said centering forces may be neutralized at a new, second neutral control position.

3. In an airplane having a pilot operated control connected to move an airplane control surface, a composite link connecting said pilot operated control to the frame of said airplane, said composite link including an extensible element and elastic force producing means for applying centering forces to said pilot operated control in series with said extensible element to maintain said pilot operated control in a desired first neutral position in the absence of pilot applied force, reversible power operated means including a power circuit connected to said extensible element to change the length thereof, continuously variable speed control means in said power circuit for determining the speed at which said power operated means will operate, means for setting said speed control means to control the speed of said power operated means both directly in proportion with the distance said pilot operated control is moved away from said first neutral position in either direction and inversely in proportion with airspeed of said airplane, and independently operable means in said power circuit for energizing said power operated means in a desired direction whereby said centering forces may be neutralized at a new, second neutral control position, the speed of neutralizing of forces on said pilot operated control being automatically determined as recited above.

4. In an airplane control system having a completely power operated attitude control surface connected to be controlled by piloting movements of a control stick, in combination, a centering force producer having an elastically centered output element, a variable length link connecting said output element to said stick, a reversible variable speed electric motor connected to vary the length of said link, said motor having a speed control circuit including a contact movable along a variable resistance therein and fastened to said output element, the speed of said motor, when energized in either direction, being least at the centered position of said output element and progressively increased on either side thereof.

5. In a trim control system for an airplane having a completely power operated attitude control surface connected to be controlled by piloting movements of a control stick, in combination, a centering force producer having an elastically centered output element, a variable length link connecting said output element to said stick, a reversible variable speed electric motor connected to said link to vary the length of said link, said motor having a speed control circuit including a pair of variable resistances therein, each said resistance having a resistance-changing contact movable therealong, airspeed measuring means in said airplane having a movable output member to which one of said contacts is attached, the speed of said motor, when energized, being inversely proportional to airspeed, the other of said contacts being attached to said force producer output element to vary the speed of said motor, when energized, directly in proportion to the distance of said element from its centered position, and means operatively connected to said motor for energizing said motor in a desired direction at will, to provide an automatically regulated surface trim speed.

References Cited in the file of this patent

UNITED STATES PATENTS

| | | |
|---|---|---|
| 2,188,834 | Fischel et al. | Jan. 30, 1940 |
| 2,387,795 | Isserstedt | Oct. 30, 1945 |
| 2,639,108 | Fenney et al. | May 19, 1953 |
| 2,719,684 | Peed | Oct. 4, 1955 |
| 2,725,203 | Blatz | Nov. 29, 1955 |